US006556304B1

United States Patent
Shibamoto

(10) Patent No.: US 6,556,304 B1
(45) Date of Patent: Apr. 29, 2003

(54) METHOD OF SUPPORTING REFERENCE PLATE FOR LIGHTWAVE INTERFEROMETER

(75) Inventor: Hiroshi Shibamoto, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/419,818

(22) Filed: Oct. 18, 1999

(30) Foreign Application Priority Data

Mar. 3, 1999 (JP) .......................................... 11-055113

(51) Int. Cl.[7] ................................................. G01B 9/02
(52) U.S. Cl. ...................................................... 356/450
(58) Field of Search ......................................... 356/450

Primary Examiner—Frank G. Font
Assistant Examiner—Andrew H. Lee

(74) Attorney, Agent, or Firm—Snider & Associates; Ronald R. Snider

(57) ABSTRACT

An O ring 41 having an inside diameter slightly smaller than the diameter of a reference plate 1 is wound about the reference plate 1 at an outer peripheral face position aligning with a neutral plane 42 of the reference plate 1, and the O ring 41 and the outer peripheral face 4 of the reference plate 1 are uniformly bonded and secured together with an adhesive 32. Subsequently, the reference plate 1 wound with the O ring 41 is inserted into an attachment 5 to be mounted to the main body of an interferometer, by way of an opening of the attachment 5. After it is confirmed that the O ring 41 is stably in contact with the abutment of the attachment 5, and that reference plate 1 is not directly in contact with the attachment 5, a pressure ring 12 is caused to press and secure the O ring 41. Thus, the reference plate 1 is prevented from deforming when being attached to the main body of the interferometer, and from rotating with respect to the optical axis thereafter, whereby interference fringes can be measured with a high accuracy and favorable reproducibility.

4 Claims, 5 Drawing Sheets

LUMINOUS FLUX

METHOD OF SUPPORTING REFERENCE PLATE FOR LIGHTWAVE INTERFEROMETER

RELATED APPLICATIONS

This application claims the priority of Japanese Patent Application No. 11-055113 filed on Mar. 3, 1999, which is incorporated herein by reference.

BACKGROUND OF THE INVENTION

1. Field of the Invention

The present invention relates to a method of supporting a reference plate for a lightwave interferometer; and, in particular, to a method of supporting a reference plate for a lightwave interferometer when the reference plate is attached to the main body of the interferometer.

2. Description of the Prior Art

Since the emergence of lasers which are light sources having a favorable coherence, lightwave interferometers which can measure surface forms of optical parts with a high accuracy have come into widespread use. A lightwave interferometer divides a luminous flux from a light source into two, employs one of the resulting two luminous fluxes as an object lightwave irradiating a sample to be inspected and thereby carrying the state of phase of the sample, employs the other as a reference lightwave irradiating a reference plate and thereby carrying the state of phase of the reference plate, and recombines these two lightwaves together, so as to obtain interference fringes corresponding to the phase difference between the lightwaves, thus only comparing the object lightwave and the reference lightwave with each other for the measurement. The detectable difference between the two lightwaves in the lightwave interferometer is about ½ of the wavelength of the employed lightwaves (corresponding to one line of the interference fringes), whereby very fine comparisons can be carried out.

In such a very fine comparison, it is important how to make the reference plate with a high precision and how to support it with the main body of the interferometer while keeping its precision.

FIG. 10 shows an example of a conventional circular reference plate for measuring a plane. The reference plate 101 is made of a material having a low coefficient of thermal expansion, e.g., quartz or ceramics. In optical systems in which a luminous flux is transmitted through the reference plate 101, in particular, uniformity is required in the refractive index distribution within the material.

Though depending on the accuracy required in measurement, the reference surface 102 is polished with such a high precision that the amount of deviation from a perfect plane is ¹⁄₂₀ or less of the employed wavelength of light. Though no such a high precision as that of the reference surface 102 is required, the rear surface 103 opposite the reference surface 102 is polished with such a precision that the abovementioned amount is about ⅕ to ¹⁄₁₀ of the employed wavelength of light, and is provided with an antireflective coating for the employed wavelength of light in order to reduce reflection noise. Further, the outer peripheral face 104 of the reference surface 102 is polished or lapped with a roughness on the order of #400 to #800 in general.

There have been some attempts to attach the reference plate 101 thus finished with a high precision to the main body of the interferometer while keeping the precision.

The example shown in FIG. 11 shows, in a barrel 110 for accommodating the reference plate 101 and mounting it to the main body portion of the interferometer, the reference plate 101 being inserted while a shoulder 111 of the barrel 110 is used as an abutment. A pressure ring 112 is used for preventing the reference plate 101 from rattling in excess, and is fixed with a slight gap from the reference plate 101 so as not to affect the precision of the reference plate 101. A screw 113 is used for attaching the reference plate unit to the main body of the interferometer and keeping a stable relative positional relationship between the main body portion of the interferometer and the reference plate 101.

However, such a method has the following two problems in terms of the accuracy in measurement.

(1) The barrel 110 made of a metal such as aluminum and the reference plate 101 made of glass, ceramics, or the like come into contact with each other at the shoulder 111 of the barrel 110, whereby the reference plate 101 presses this contact portion with its own weight. Since the shoulder 111 of the barrel 110 processed by cutting or the like and the polished surface of the reference plate 101 have different degrees of processing precision, it is hard to attain a uniform contact state between these members 101, 111, whereby they come into contact with each other by point contact of at least three points as shown in FIG. 12. Letting A, B, and C be the three points of contact, the part of the reference plate 101 outside the triangle ABC is flexed by the own weight of the reference plate 101, so as to be changed into a form schematically indicated by contour lines 120 in FIG. 12. Thus, the measurement using this reference plate 101 may yield an error in measurement corresponding to the change in form of the reference plate 101 such as that indicated by the contour lines 120.

(2) As shown in FIG. 11, the reference plate 101 is unfixed though it does not drop out of the barrel 110, thus being able to rotate freely about the optical axis at its mounted position. This feature does not cause any problem as long as the reference plate 101 is a perfect plane so that the form of the sample to be compared can be measured however it is rotated. In practice, however, it is hard to form a perfect plane, and the reference plate 101 has different plane forms, though slightly, among its portions. Since the interference measurement is based on the comparison as mentioned above, comparative data, i.e., measured values, of the sample will become unstable if the reference plate 101 to be compared rotates freely. Also, local differences in the form of the reference plate 101 may change the contact positions between the sample and the shoulder 111 of the barrel 110, whereby the supporting of the reference plate 101 according to the above-mentioned method may affect the amount of flexure of the reference plate 101 as well.

FIG. 13 shows a method of supporting a reference plate which can overcome the shortcomings of the conventional example shown in FIG. 11.

In this method, a cushioning material 121 made of thick paper or the like is held between the reference plate 101 and the shoulder 111 of the barrel 110, which have been in contact with each other due to the own weight of the former in the conventional example shown in FIG. 11. Thus, the error in precision of the shoulder 111 of the barrel 110 due to machining is absorbed by the elasticity of the cushioning material 121, so that the reference plate 101 comes into contact therewith by the whole outer peripheral face of the reference surface. As a consequence of this improvement, the reference plate 101 is kept from changing its form due to its contact points as shown in FIG. 12, and only yields changes in form due to its own weight flexure caused as being supported by the whole periphery as shown in FIG. 14.

In this case, however, the cushioning member 121 held between the reference plate 101 and the shoulder 111 of the barrel 110 is kept being pressed with the weight of the reference plate 101, whereby it may lose its elasticity over time and may reduce cushioning effects. Namely, as the time passes, the form of the reference plate 101 may change from the state shown in FIG. 14 to that shown in FIG. 12.

FIG. 15 shows a method of supporting the reference plate 101 which overcomes such a problem. In this method, the reference plate 101 is not mounted on the shoulder 111 of the barrel 110. Instead, an adhesive 132 is injected by a syringe or the like into small holes 131 equidistantly formed in the circumference of the barrel 110, so as to bond and secure the reference plate in a suspended state. According to this method, nothing comes into contact with the reference surface 102 of the reference plate 101, whereby the problem of deterioration in precision of the reference plate 101 caused by its contact with the shoulder 111 of the barrel 110, such as that in the conventional example mentioned above, would not occur.

However, this supporting method has problems as follows:

(1) If the number of the small holes 131 equidistantly formed in the circumference of the barrel 110 is small, then nonuniform own weight flexures may occur in the reference plate 101 as in the above-mentioned two conventional examples, thereby generating a problem such as that shown in FIG. 12.

(2) If the amount of injection of the adhesive 132 or the thickness of the adhesive layer formed thereby varies, then nonuniform forces due to changes in volume upon curing may be applied to the reference plate 101, whereby the high-precision reference surface 102 may be deformed.

(3) Though there will be no problem if the adhesive 132 is injected and cured about the vicinity of the center of opposing two surfaces of the reference plate 101, the reference surface 102 may deform greatly if the adhesive 132 is lopsided to one surface.

(4) The amount of use of the adhesive 132 may be minimized so as to avoid the above-mentioned two problems (2) and (3). If the amount of use of the adhesive 132 is too small, however, since the material forming the barrel 110 and that forming the reference plate 101 have coefficients of thermal expansion different from each other, the adhesive 132 may peel off, whereby the reference plate 101 may drop out of the barrel 110.

(5) It becomes difficult to remove the reference plate 101 from the barrel 110 when the reference plate 101 is to be polished for mending a flaw or the like formed therein, whereby operations of restoring the reference plate 101 would be difficult.

SUMMARY OF THE INVENTION

In order to overcome these problems, it is an object of the present invention to provide a method of supporting a reference plate for a lightwave interferometer, which can suppress the deformation of the reference surface caused when the reference plate is supported by an attachment for attaching the reference plate to the main body of the interferometer, and can easily attach/remove the reference plate to/from the attachment.

In the method of the present invention, for overcoming the above-mentioned problems, the outer peripheral face of the reference plate is supported, by way of an elastic member, by an attachment for attaching the reference plate to the main body of the interferometer. As a consequence, the reference plate can be prevented from flexing due to the nonuniform supporting of the reference plate occurring in each of the above-mentioned conventional techniques, and the reference plate can be kept from rotating in its barrel and thereby varying measured values.

Also, in the method of the present invention, since the reference plate comes into contact with the barrel by way of the elastic member at predetermined positions substantially uniformly arranged on the outer peripheral face, nonuniform forces would not occur with respect to the reference plate due to the curing of an adhesive, whereby the reference plate would be kept from nonuniformly flexing.

When the position at which the elastic member comes into contact with the reference plate substantially aligns with a neutral plane of the reference plate in its thickness direction, expanding/contracting forces are hardly applied on the elastic member, whereby the reference plate can stably be supported by the attachment for attaching it to the main body of the interferometer.

When the reference plate is needed to be wound with a plurality of lines of elastic members; if the reference plate is wound with the elastic members at positions symmetrical to each other with respect to the neutral plane, then the respective elastic members located at the symmetrical positions have the same amount of expansion and the same amount of contraction, whereby it is advantageous in that those with the same specification can be used.

For enhancing the stability at the time of supporting the reference plate by the attachment, the outer peripheral face of the reference plate may be provided with a grove aligning with the neutral plane, so as to be wound with the elastic member. As a consequence, the reference plate can be prevented from accidentally dropping off, and so forth. When the groove substantially aligns with the neutral plane, expanding/contracting forces are hardly applied to the groove, whereby the reference plate can be prevented from being damaged due to the processing of the groove, for example.

If the inner peripheral face of the attachment is provided with a groove extending along the circumferential direction thereof, and the elastic member wound about the outer peripheral face of the reference plate is caused to engage this groove, the reference plate will be supported more stably.

The above-mentioned "elastic member" refers to any member as long as it has some elastic effects. Examples thereof include thick paper, foam styrol, and the like.

DESCRIPTION OF THE PREFERRED EMBODIMENTS

In the following, the method of supporting a reference plate for a lightwave interferometer in accordance with embodiments of the present invention will be explained with reference to the accompanying drawings.

EXAMPLE 1

Figure 1:
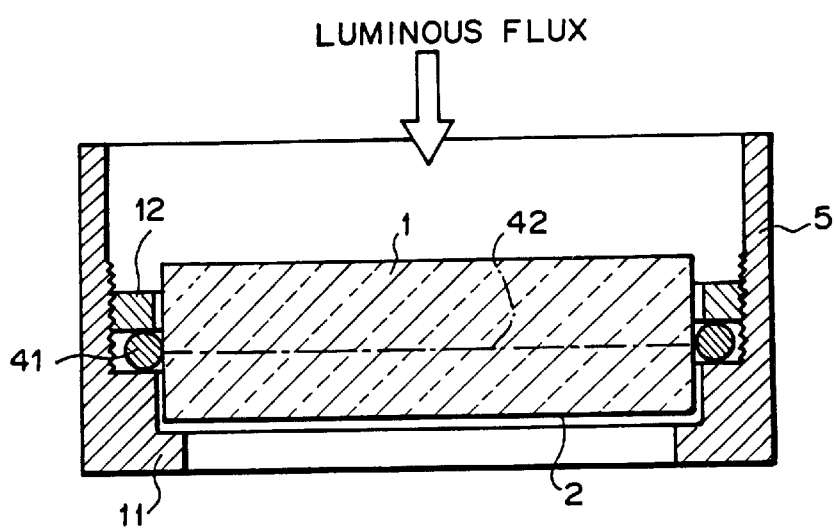
FIG. 1 is a schematic view for explaining the method of supporting a reference plate for a lightwave interferometer in accordance with an embodiment of the present invention.
Figure 2:
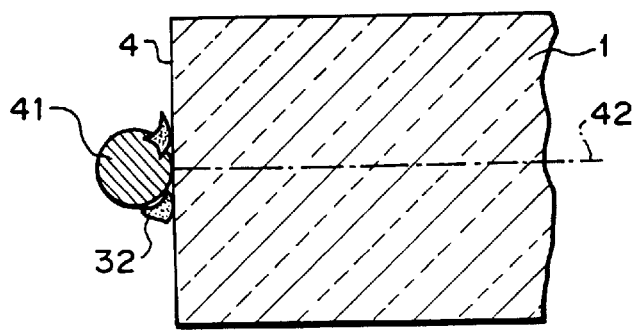
FIG. 2 is a schematic view showing the embodiment shown in FIG. 1.

FIG. 1 shows an example using an O ring, which is an oil-sealing member, as an elastic member for winding. As shown in FIG. 2, an O ring 41 having an inside diameter slightly smaller than the diameter of a reference plate 1 is wound about the reference plate 1 at an outer peripheral face position aligning with a neutral plane 42 of a reference plate 1, and the O ring 41 and the outer peripheral face 4 of a reference surface 2 are uniformly bonded and secured together with a cyanoacrylate type adhesive 32. Subsequently, the reference plate 1 wound with the O ring 41 is inserted into an attachment 5 to be mounted to the main body of an interferometer, by way of an opening of the attachment 5. After it is confirmed that the O ring 41 is stably in contact with the abutment of the attachment 5, and that reference plate 1 is not directly in contact with the attachment 5, a pressure ring 12 is caused to press and secure the O ring 41.

Figure 12:
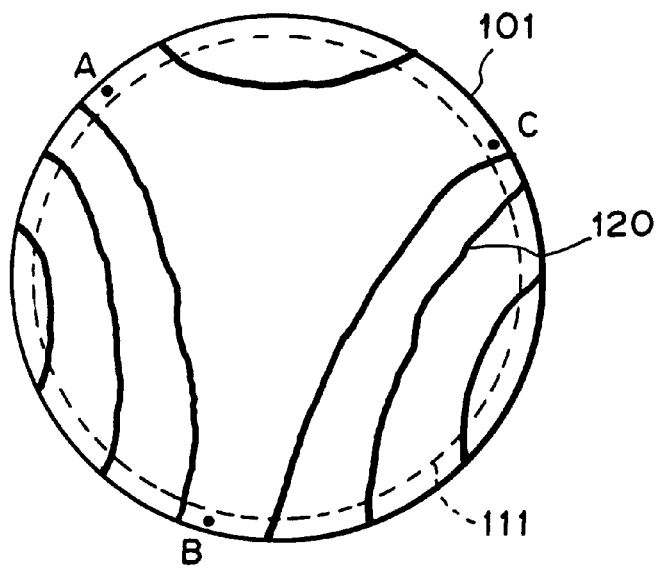
FIG. 12 is a schematic view showing the state of deformation of the reference plate in the conventional method.
Figure 13:
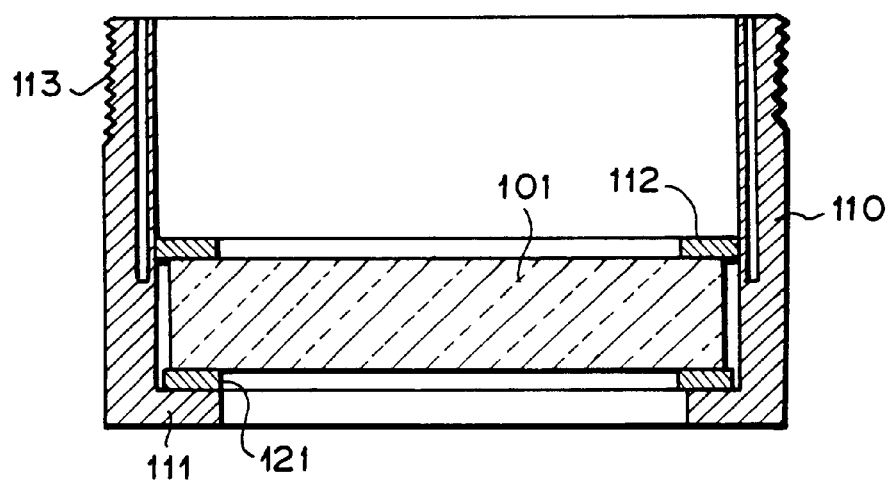
FIG. 13 is a schematic view for explaining another conventional method.
Figure 14:
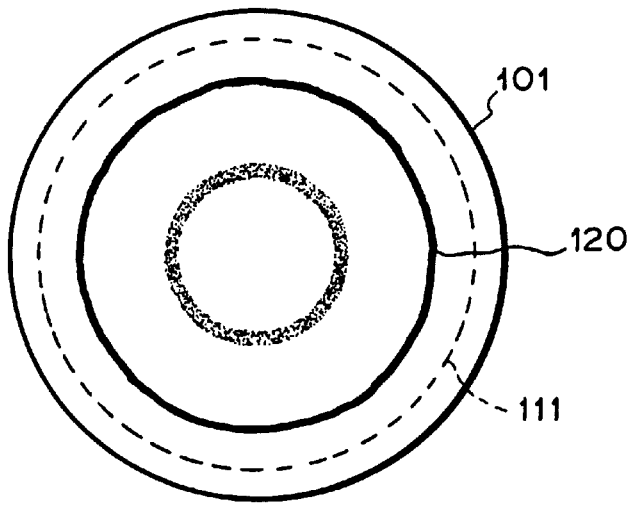
FIG. 14 is a schematic view showing the state of deformation of the reference plate due to its own weight flexure alone.
Figure 15:
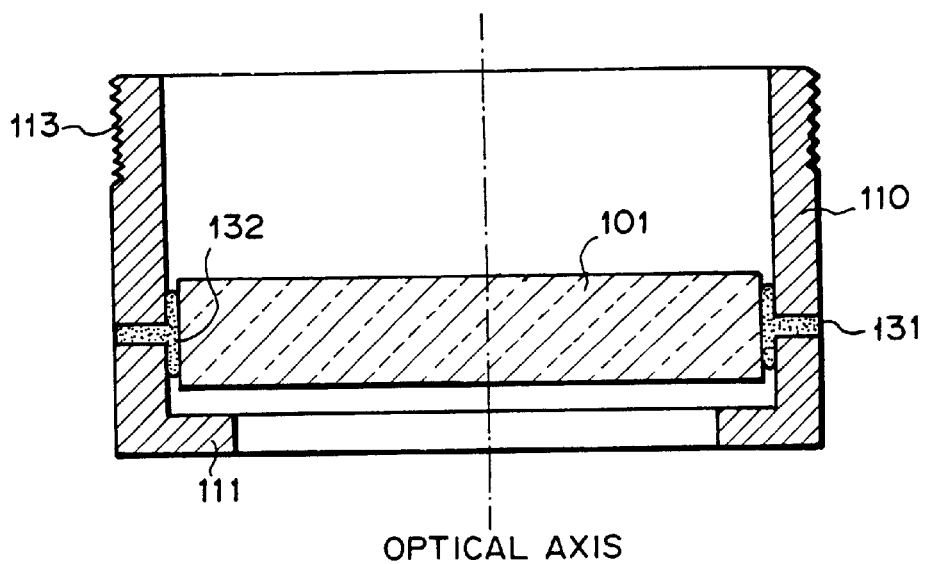
FIG. 15 is a schematic view for explaining still another conventional method.

In this method, external forces applied to the reference plate 1 except for the gravity can be made substantially uniform. Namely, nonuniform deformations of the reference plate 1 which occur, as explained with reference to FIG. 12, when the influences of external forces lose their uniformity can be prevented from occurring.

Also, since the O ring 41 is sandwiched, the reference surface 2 would not rotate, whereby stable measurement data can be obtained.

Further, since the reference plate 1 is supported by being pressed with the pressure ring 12, the reference plate 1 can easily be removed from the attachment 5 when a flaw or the like is found in the reference plate 1, whereby operations of restoring the reference plate 1 can be carried out easily.

Figure 9:
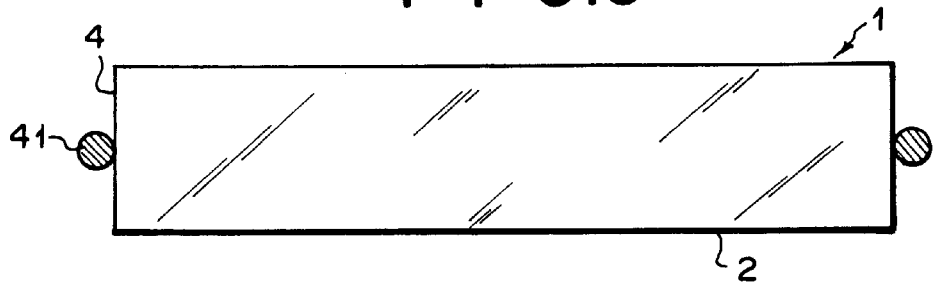
FIG. 9 is a side view showing a specific example of the reference plate used in the method of the present invention.
Figure 10:
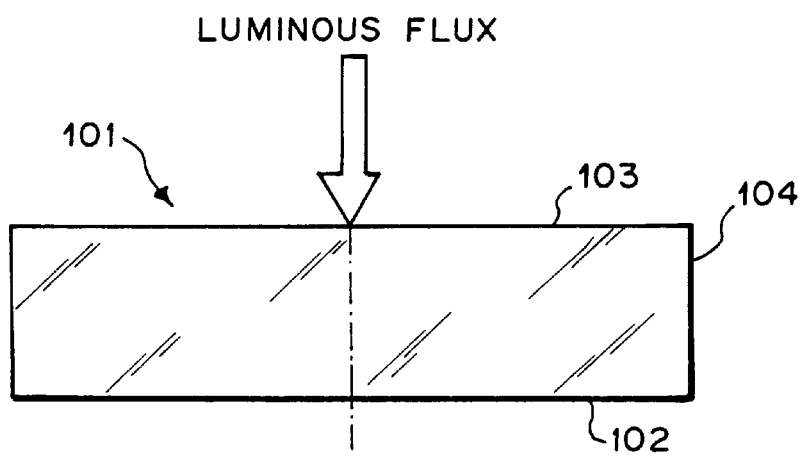
FIG. 10 is a schematic view of a reference plate for explaining a conventional method.
Figure 11:
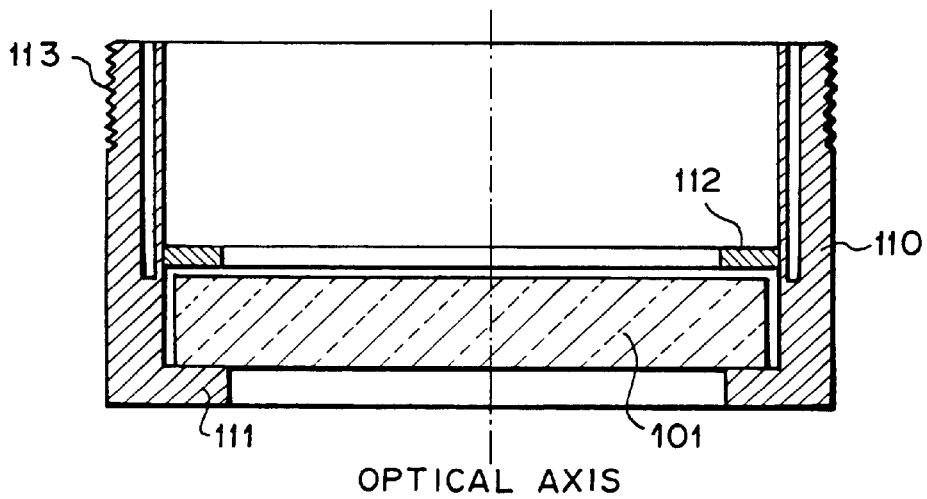
FIG. 11 is a schematic view for explaining the conventional method.

For example, the reference plate 1 may have such a specific form as a disc shown in FIG. 9 with a diameter of 160 mm and a thickness of 30 mm.

EXAMPLE 2

Figure 3:
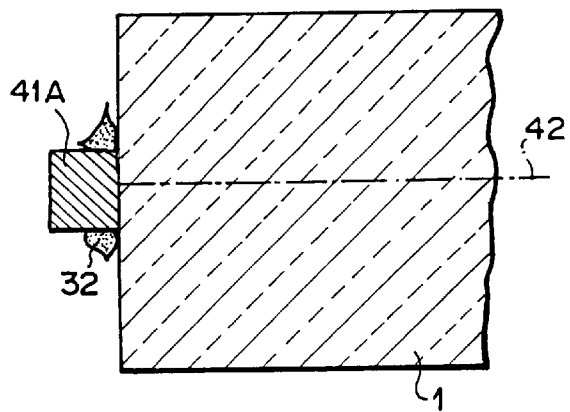
FIG. 3 is a schematic view showing a partly modified example of the embodiment shown in FIG. 1.

FIG. 3 shows an example in which the reference plate 1 is wound with a gasket 41A having a rectangular cross section instead of the O ring 41 in Example 1. The reference plate 1 can be supported by the attachment 5 in a manner similar to that in Example 1.

When thus wound with various oil-sealing members made of elastic materials instead of the O ring 41, the reference plate 1 can also be supported effectively as in the case of the above-mentioned Example 1.

Though oil-sealing members exemplified by the O ring 41 are preferable as the elastic member to be wound about the reference plate 1 from the viewpoints of form, selectivity of materials, and availability; without being restricted thereto, various elastic cushioning members can be used in place of the O ring 41.

EXAMPLE 3

Figure 4:
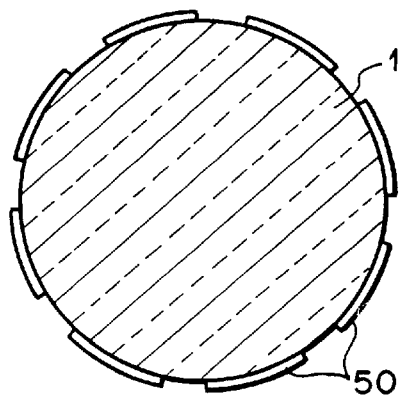
FIG. 4 is a schematic view showing an embodiment different from that shown in FIG. 1.
Figure 5:
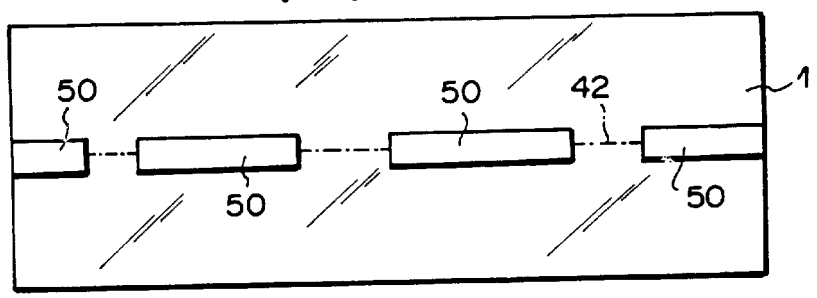
FIG. 5 is a side view of FIG. 4.

FIG. 4 is a schematic plan view showing an example in which sheets 50 of foam styrol are wound about and bonded to the outer peripheral face 4 of the reference plate 1. FIG. 5 is a side view of FIG. 4. In this example, without the whole outer peripheral face of the circular reference plate 1 being wound with an elastic member, the outer peripheral face 4 is wound with the sheets 50, while such gaps that the reference plate 1 would not irregularly deform due to the relationship between its own weight and supporting points when supported by the attachment 5 for attaching the reference plate 1 to the main body of the interferometer are provided at constant intervals in the lengthwise direction. The reference plate 1 thus wound with the elastic member can be supported by the attachment 5 according to a securing method such as that shown in FIG. 1.

Though the foam styrol sheets 50 are used as the elastic cushioning member in this example, a wide range of materials such as rubber sheets, foam polystyrene, and the like can be used in place thereof.

EXAMPLE 4

Figure 6:
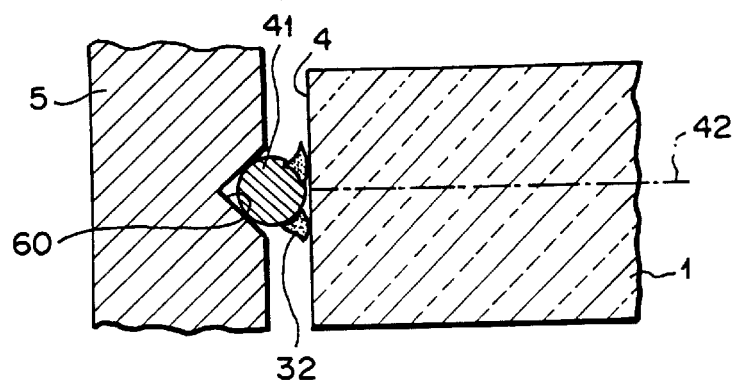
FIG. 6 is a view for explaining an embodiment different from those shown in FIGS. 1 and 4.

FIG. 6 shows a method of supporting the reference plate 1 wound with the O ring 41 by the attachment 5 to be attached to the main body of the interferometer, in which the inner periphery of the attachment 5 is provided with a groove (V-shaped groove) 60, and the O ring 41 is fitted into the groove 60 while the O ring 41 is wound about the outer peripheral face 4 of the reference plate 1, so that the reference plate 1 is fixed at a predetermined position in the attachment 5. The method of this example is a very effective supporting method in that it can reduce the number of parts for supporting the reference plate 1.

EXAMPLE 5

Figure 7:
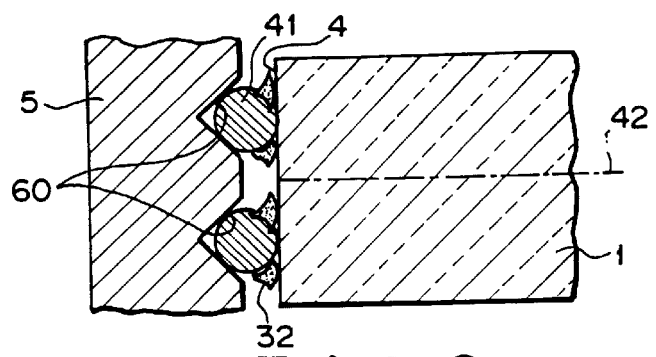
FIG. 7 is a view for explaining an embodiment different from those shown in FIGS. 1, 4, and 6.

FIG. 7 shows an example in which two O rings 41, which are elastic members, are used so as to support the reference plate 1 by the attachment 5 more firmly. These two O rings 41 are bonded and secured to the outer peripheral face 4 of the reference plate 1 at their respective positions symmetrical to each other with respect to the neutral plane 42. In this example, two grooves (V-shaped grooves and/or U-shaped grooves) 60 are formed in the inner peripheral face of the attachment 5 so as to correspond to the respective positions of the O rings 41. The O rings 41 wound about the outer peripheral face 4 of the reference plate 1 are fitted into their respective grooves 60, whereby the reference plate 1 is fixed at a predetermined position in the attachment 5.

When the two O rings 41 are disposed at positions symmetrical to each other with respect to the neutral plane 42, O rings having the same specification can be used.

EXAMPLE 6

Figure 8:
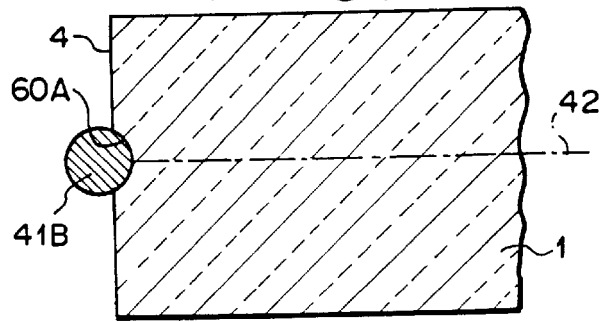
FIG. 8 is a view for explaining an embodiment different from those shown in FIGS. 1, 4, 6, and 7.

FIG. 8 shows a method of securing the O ring 41 wound about the reference plate 1 with respect to the reference plate 1 in accordance with another example.

In this method, at an outer peripheral surface position aligning with the substantially neutral plane 42 of the reference plate 1 made of glass, ceramics, quartz, or the like, a groove 60A which exhibits such a holding force that the reference plate 1 would not drop off due to its own weight is formed, and an elastic member 41B wound about the outer peripheral face 4 is fitted into and secured to the groove 60A. As a consequence, the reference plate 1 is securely supported by the attachment 5 by way of the elastic member 41B, without fear of dropping off.

Hence, the O ring 41B and the reference plate 1 can be attached to each other without an adhesive.

The groove 60A can easily be made by processing with a diamond tool or abrasive grains.

Though the groove preferably has a U-shaped form, any form can be employed as long as it does not lower the surface precision of the reference plate 1 and is hard to damage. Nevertheless, there are cases where the elastic material cannot be held firmly depending on the form of the groove. In these cases, the adhesive 32 may be used together therewith.

Though the O ring 41 is used as the elastic member to be fitted into the grooves 60, 60A in these examples, other elastic members such as those shown in the examples mentioned earlier may be fitted into and secured to the grooves 60, 60A.

In the method of the present invention, if the reference surface does not deform when the attachment is caused to support the reference plate at its outer peripheral face by way of such an elastic member, then the reference surface may be supported so as to come into contact with the elastic member at a part of the outer peripheral face as shown in FIG. 4. Namely, it will be sufficient if the portion where no elastic member exists in the outer peripheral face does not continuously extend over 90°. For example, the reference plate may be supported by the elastic member at four points. Further, when there are three contact surfaces between the reference surface and the elastic member, it is necessary that the individual contact portions be located at intervals of an identical angle, while each contact portion extends over substantially the same angular range not smaller than 30°.

In the method of supporting a reference plate for a lightwave interferometer in accordance with the present invention, as explained in the foregoing, since the reference plate is uniformly supported by the attachment by way of an elastic member, even in an measuring operation using an interferometer which requires a very high accuracy in measurement, the reference plate to be used as a reference for comparison in the measurement would not deform when being attached to the main body of the interferometer, and the reference plate would not generate such movement as rotation with respect to the optical axis when supported by the reference plate.

As a consequence, interference fringes can be measured with a high accuracy and favorable reproducibility.

What is claimed is:

1. A method of supporting a reference plate for a lightwave interferometer which divides a luminous flux from a light source into two, employs one of the resulting two luminous fluxes as an object lightwave irradiating a sample to be inspected and thereby carrying the state of phase of said sample, employs the other as a reference lightwave irradiating said reference plate and thereby carrying the state of phase of said reference plate, and recombines the two lightwaves together, so as to obtain interference fringes corresponding to the phase difference between said lightwaves;

said method comprising the step of supporting said reference plate by an outer peripheral face thereof with an attachment for attaching said reference plate to a main body of said interferometer, wherein said outer peripheral face of said reference plate is supported at a plurality of points or within a predetermined area by way of an elastic member, such that a continuous portion where no said elastic member exists about said outer peripheral face is not greater than 90°; and wherein said elastic member is an oil-sealing member.

2. A method of supporting a reference plate for a lightwave interferometer which divides a luminous flux from a light source into two, employs one of the resulting two luminous fluxes as an object lightwave irradiating a sample to be inspected and thereby carrying the state of phase of said sample, employs the other as a reference lightwave irradiating said reference plate and thereby carrying the state of phase of said reference plate, and recombines the two lightwaves together, so as to obtain interference fringes corresponding to the phase difference between said lightwaves;

said method comprising the step of supporting said reference plate by an outer peripheral face thereof with an attachment for attaching said reference plate to a main body of said interferometer, wherein said outer peripheral face of said reference plate is supported at a plurality of points or within a predetermined area by way of an elastic member, such that a continuous portion where no said elastic member exists about said outer peripheral face is not greater than 90°;

wherein said elastic member is disposed so as to substantially align with an outer peripheral line of a neutral plane in the thickness direction of said reference plate; and wherein said elastic member engages a groove for winding said elastic member, said groove being formed in said outer peripheral face of said reference plate so as to align with the position where said elastic member is wound.

3. A method of supporting a reference plate for a lightwave interferometer which divides a luminous flux from a light source into two, employs one of the resulting two luminous fluxes as an object lightwave irradiating a sample to be inspected and thereby carrying the state of phase of said sample, employs the other as a reference lightwave irradiating said reference plate and thereby carrying the state of phase of said reference plate, and recombines the two lightwaves together, so as to obtain interference fringes corresponding to the phase difference between said lightwaves;

said method comprising the step of supporting said reference plate by an outer peripheral face thereof with an attachment for attaching said reference plate to a main body of said interferometer, wherein said outer peripheral face of said reference plate is supported at a plurality of points or within a predetermined area by way of an elastic member, such that a continuous portion where no said elastic member exists about said outer peripheral face is not greater than 90°; and wherein a plurality of elastic members are disposed parallel to an outer peripheral line of a neutral plane of said reference plate in the thickness direction, said plurality of elastic members being disposed symmetrical to each other with respect to said neutral plane.

4. A method of supporting a reference plate for a lightwave interferometer according to claim 3, wherein said elastic members engage respective grooves for winding said elastic members, said grooves being formed in said outer peripheral face of said reference plate so as to align with the respective positions where said elastic members are wound.

* * * * *